United States Patent Office 2,768,188
Patented Oct. 23, 1956

2,768,188
PROCESS FOR PRODUCING $\Delta^{8,9}$-7,11-DIHYDROXY-STEROIDS

Leopold Ruzicka, Hans Heusser, and Oskar Jeger, Zurich, Switzerland, assignors to Ciba Pharmaceutical Products, Inc., Summit, N. J.

No Drawing. Application December 13, 1951,
Serial No. 261,578

Claims priority, application Switzerland
December 22, 1950

4 Claims. (Cl. 260—397.1)

The present invention is concerned with a new process leading to new compounds which make it possible to synthesize therapeutically active steroids containing oxygen in the 11-position.

The steroids with oxygen in 11-position are of great importance. An important representative of this class of compounds is for example cortisone, $\Delta^4$-3,11,20-trioxo-17α,21-dihydroxy-pregnene. The hitherto known processes for the synthetic production of such steroids use as starting materials desoxycholic acid and its derivatives, that is to say compounds which possess a hydroxyl group in 12-position. It has been shown however that the transfer of oxygen from the 12- to the 11-position is a very tedius process requiring several operations. In addition the desoxycholic acid used as starting material is only obtainable in relatively limited quantity, so that for example it is practically impossible to manufacture the cortisone required in therapy in sufficient quantity by this method. A requirement therefore exists for new sources for the manufacture of this medicament. The easily available sterols, such as ergosterol, stigmasterol, or sitosterol, but more especially cholesterol, have indeed for many years been important starting materials for the production of sex hormones. They have however hitherto been without importance for the production of compounds with oxygen in the 11-position of the intact steroid structure.

The present invention is based on the observation that by starting from the above-mentioned sterols or conversion products thereof, compounds of the steroid series with oxygen in the 11-position can be obtained when a $\Delta^{7,8;9,11}$-steroid is treated with an agent capable of introducing oxygen, the resultant compound containing the oxido group in one of the positions 7,8 and 9,11 is hydrolyzed and isomerized, an oxidizing agent is caused to act on the $\Delta^{8,8}$-7,11-dihydroxy-compound formed, the resultant 7,11-dioxo-steroid is treated with a hydrogenating agent and the oxo-group in 7-position is removed by reduction.

The process is illustrated by the following diagram of partial formulae:

An object of the present invention are $\Delta^{8,9}$-7,11-dihydroxy-steroids. These compounds are new and are intended for use as intermediate products for the preparation of 11-oxo-steroids and 11-hydroxy-steroids. Thus, e. g., by the present invention there is produced inter alia the methyl $\Delta^{8,9}$-3α-acetoxy-7,11-dihydroxy-cholenate which is convertible by the processes set forth in copending applications Ser. Nos. 261,579 (see e. g. Ex. 4), and 261,580 (see e. g. Ex. 4) into the methyl-3α-acetoxy-11-oxo-cholenate (see e. g. Ex. 5 of Ser. No. 261,581) which is a recognized and well known intermediate for the production of the highly active hormone 11-dehydro-corticosterone (cf. Wettstein and Meystre: Helv. Chim. Acta, vol. 30, p. 1262–1265 (1947)), all said copending applications having been filed on even date herewith. Another object of the invention is a process for the manufacture of $\Delta^{8,9}$-7,11-dihydroxy-steroids. It comprises reacting an oxido compound of a $\Delta^{7,8;9,11}$-steroid containing the oxido group in one of the positions 7,8 and 9,11 under mild acidic conditions.

These oxido-steroids belong to the cyclopentanopolyhydrophenanthrene or the polyhydrochrysene series. Particular importance is attached to the derivatives of cholestane, coprostane, sitostane, stigmastane, cholane, allocholane, pregnane, androstane and etiocholane. In addition to the aforementioned double bond, the starting materials may have other double bonds. They can be obtained, e. g. by treating a $\Delta^{7,8;9,11}$-steroid with a peracid according to copending U. S. patent application Serial No. 261,577, filed December 31, 1951.

For the isomerization according to the present invention inorganic or organic acids are used, e. g. sulfuric acid or trichloracetic acid. The reaction is advantageously carried out in an aqueous medium at room temperature.

The following examples illustrate the invention, the relation between parts by weight and parts by volume being the same as that between the gram and the cubic centimeter:

Example 1

0.2 part by weight of $\Delta^{7,8;22,23}$-3β-acetoxy-9,11-oxido-ergostadiene (obtained according to U. S. patent application Serial No. 261,577, filed December 13, 1951, by causing a peracid to act on $\Delta^{7,8;9,11;22,23}$-3β-acetoxy-ergostatriene) is dissolved in 150 parts by volume of dioxane, admixed with 27 parts by volume of 2 N-sulfuric acid, and vigorously agitated for about 3 minutes at room temperature. The reaction solution is then immediately treated with ether and sodium bicorbonate solution. The ethereal solution is quickly washed with water, dried and evaporated. The crystalline crude product yields, on recrystallization from acetone, 0.14 part by weight of

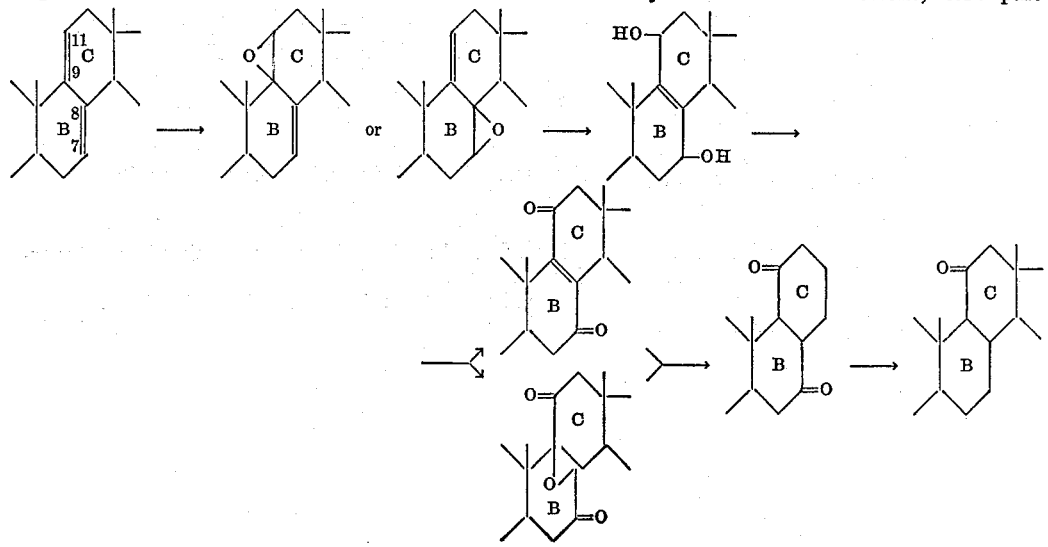

$\Delta^{8,9:22,23}$-3$\beta$-acetoxy-7,11-dihydroxy-ergostadiene of melting point 269–270° C., $[\alpha]_D^{22}=+82°$ (c=0.331 in chloroform).

The afore-described $\Delta^{8,9:22,23}$-3$\beta$-acetoxy-7,11-dihydroxy-ergostadiene can also be obtained in the following way:

1 part by weight of $\Delta^{7,8:22,23}$-3$\beta$-acetoxy-9,11,-oxido-ergostadiene is dissolved in 200 parts by volume of acetone, admixed with 70 parts by volume of water and 1 part by volume of 2 N-sulfuric acid and stored for a rather long time at low temperature. The greater part of the acetone is then evaporated under reduced pressure, the residue is taken up in alcoholic chloroform, and the solution worked up in the usual manner.

Example 2

1 part by volume of $\Delta^{7,8}$-3$\beta$;20-diacetoxy-9,11-oxido-allo-pregnene (obtained by treating the $\Delta^{7,8:9,11}$-3$\beta$,20-diacetoxy-allo-pregnadiene with a peracid according to U. S. patent application Serial No. 261,577, filed December 13, 1951) is dissolved in 150 parts by volume of dioxane and the solution is admixed at room temperature with 40 parts by volume of 0.3 N-aqueous sulfuric acid. After 10 minutes, the reaction product is poured into a separating funnel containing 1000 parts by volume of ether and 500 parts by volume of a saturated aqueous sodium bicarbonate solution. The mixture is thoroughly agitated and the ethereal solution is washed again with water. When the dried ethereal solution is evaporated, the $\Delta^{8,9}$-3$\beta$;20-diacetoxy-7,11-dihydroxy-allo-pregnene crystallizes.

Example 3

By treating a solution of 1 part by weight of $\Delta^{7,8:22,23}$-3$\beta$-acetoxy-9,11-oxido-stigmastadiene (obtained by treating the $\Delta^{7,8:9,11:22,23}$-3$\beta$-acetoxy-stigmastatriene with a peracid according to U. S. patent application Serial No. 261,577, filed December 13, 1951) in 200 parts by volume of dioxane with 40 parts by volume of 0.3 N-aqueous sulfuric acid at room temperature and working up according to Example 1, there is obtained the $\Delta^{8,9:22,23}$-3$\beta$-acetoxy-7,11-dihydroxy-stigmastadiene, which is purified by crystallization from acetone.

Example 4

2.9 parts by weight of methyl $\Delta^{9,11}$-3$\alpha$-acetoxy-7,8-oxido-cholenate (obtained by treating methyl $\Delta^{7,8:9,11}$-3$\alpha$ acetoxy-choladienate with a peracid according to U. S. patent application Serial No. 261,577, filed December 13, 1951) are dissolved in 375 parts by volume of absolute dioxane and the solution agitated for about 5 minutes at room temperature with 66 parts by volume of 2 N-sulfuric acid. The solution is then immediately transferred to a separating funnel containing ether and sodium bicarbonate solution, and thoroughly shaken. After washing, drying and evaporating the ether there is obtained the methyl $\Delta^{8,9}$-3$\alpha$-acetoxy-7,11-dihydroxy-cholenate in the form of an oil.

Example 5

1.2 parts by weight of crude $\Delta^{7,8}$-9,11-oxido-3$\beta$,17$\beta$-diacetoxy-androstene (obtained by treating $\Delta^{7,8:9,11}$-3$\beta$,17$\beta$-diacetoxy-androstadiene with a peracid according to U. S. patent application Serial No. 261,577 filed December 13, 1951) are dissolved in 300 parts by volume of pure dioxane, admixed with 50 parts by volume of 2 N-sulfuric acid and after 5 minutes the reaction mixture is poured into a separating funnel containing 300 parts by volume of a saturated sodium bicarbonate solution and 500 parts by volume of ether, and immediately shaken thoroughly. The supernatant organic solution is washed twice with 100 parts by volume of a saturated sodium bicarbonate solution each time with 100 parts by volume of water each time. All aqueous extracts are re-extracted twice with 500 parts by volume of ether each time. The combined ethereal solutions are dried and evaporated at a bath temperature of 50° C. There are obtained in this manner 1.37 parts by weight of a solid residue. By recrystallization from acetone, there is obtained the $\Delta^{8,9}$-7,11-dihydroxy-3$\beta$,17$\beta$-diacetoxy-androstene of melting point 208–210° C. in the form of long felt-like needles; $[\alpha]_D=+55°$ in chloroform. It is difficultly soluble in ether.

Example 6

1 part by weight of crude $\Delta^{7,8}$-3$\beta$-acetoxy-9,11-oxido-cholestene (obtained according to U. S. patent application Serial No. 261,577, filed December 13, 1951) by causing a peracid to act on $\Delta^{7,8:9,11}$-3$\beta$-acetoxy-cholestadiene) is dissolved in 210 parts by volume of pure dioxane, admixed with 40 parts by volume of 2 N-sulfuric acid and well stirred for about 5 minutes. The solution is then poured into a separating funnel containing 300 parts by volume of saturated sodium bicarbonate solution and 500 parts by volume of ether, and at once shaken thoroughly. The ethereal solution is washed twice with 100 parts by volume of a saturated sodium bicarbonate solution each time, and three times with 100 parts by volume of water each time, dried, filtered and evaporated at a bath temperature of 50° C. There are obtained 1.05 parts by weight of a solid residue which, when recrystallized from acetone and then from methanol, melts at 228–230° C. It is the $\Delta^{8,9}$-3$\beta$-acetoxy-7,11-dihydroxy-cholestene.

What is claimed is:

1. A process for the preparation of a $\Delta^{8,9}$-7,11-dihydroxy-steroid, which comprises subjecting a member selected from the group consisting of $\Delta^{7,8}$-3-lower alkylcarbonyloxy-9,11-oxido-ergostenes, $\Delta^{7,8}$-3-lower alkylcarbonyloxy-9,11-oxido-allo-pregnenes, $\Delta^{7,8}$-3-lower alkylcarbonyloxy-9,11-oxido-stigmastadienes, $\Delta^{9,11}$-3-lower alkylcarbonyloxy-7,8-oxido-cholenes, $\Delta^{7,8}$-3-lower alkylcarbonyloxy-9,11-oxido-androstenes and $\Delta^{7,8}$-3-lower alkylcarbonyloxy-9,11-oxido-cholestenes to the action of an acid under mild conditions, whereby hydrolysis and isomerization to the corresponding $\Delta^{8,9}$-7,11-dihydroxy-compound takes place.

2. A process for the conversion of a lower alkyl $\Delta^{9,11}$-3-lower alkylcarbonyloxy-7,8-oxido-cholenate to the corresponding lower alkyl $\Delta^{8,9}$-3-lower alkylcarbonyloxy-7,11-dihydroxy-cholenate, which comprises treating the lower alkyl $\Delta^{9,11}$-3-lower alkylcarbonyloxy-7,8-oxido-cholenate with an acid under mild conditions.

3. A process for the conversion of a lower alkyl $\Delta^{9,11}$-3-acetoxy-7,8-oxido-cholenate to the corresponding lower alkyl $\Delta^{8,9}$-3-acetoxy-7,11-dihydroxy-cholenate, which comprises treating the lower alkyl $\Delta^{9,11}$-3-acetoxy-7,8-oxido-cholenate with sulfuric acid under mild conditions.

4. A process for the conversion of methyl $\Delta^{9,11}$-3$\alpha$-acetoxy-7,8-oxido-cholenate to the corresponding methyl $\Delta^{8,9}$-3$\alpha$-acetoxy-7,11-dihydroxy-cholenate, which comprises treating the methyl $\Delta^{9,11}$-3$\alpha$-acetoxy-7,8-oxido-cholenate with sulfuric acid under mild conditions.

References Cited in the file of this patent

Fieser et al.: Natural Products Related to Phenanthrene, 3rd ed., page 425 (1949).
Chamberlin et al.: JACS 73, 2396–97 (1951).
Heusser et al.: Helv. Chim. Acta 34, 2106–32 (1951).